(12) United States Patent
Mosko

(10) Patent No.: US 10,873,564 B2
(45) Date of Patent: Dec. 22, 2020

(54) CLOUD-BASED DEVICE MANAGER BASED ON MESSAGE QUEUES

(71) Applicant: Palo Alto Research Center Incorporated, Palo Alto, CA (US)

(72) Inventor: Marc E. Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 43 days.

(21) Appl. No.: 16/137,194

(22) Filed: Sep. 20, 2018

(65) Prior Publication Data

US 2020/0099655 A1    Mar. 26, 2020

(51) Int. Cl.
*H04L 29/12* (2006.01)
*H04L 12/24* (2006.01)
*H04L 29/06* (2006.01)

(52) U.S. Cl.
CPC ........ *H04L 61/256* (2013.01); *H04L 41/0213* (2013.01); *H04L 41/12* (2013.01); *H04L 61/2007* (2013.01); *H04L 63/166* (2013.01); *H04L 61/2046* (2013.01)

(58) Field of Classification Search
CPC ............... H04L 61/256; H04L 61/2007; H04L 41/0213; H04L 63/166; H04L 41/12; H04L 61/2046; H04L 61/2015; H04L 61/2514; H04L 61/2517; H04L 63/0428; H04L 63/0823

See application file for complete search history.

(56) References Cited

U.S. PATENT DOCUMENTS

| | | | | |
|---|---|---|---|---|
| 7,561,571 B1 * | 7/2009 | Lovett | ..................... | H04L 12/66 370/392 |
| 7,843,906 B1 * | 11/2010 | Chidambaram | .... | H04L 67/1097 370/386 |
| 7,970,949 B2 * | 6/2011 | Pope | ....................... | G06F 9/544 709/250 |
| 8,422,397 B2 * | 4/2013 | Ansari | .................... | H04L 12/66 370/254 |
| 8,443,066 B1 * | 5/2013 | Saraiya | ................. | G06F 13/387 709/222 |
| 8,601,053 B2 * | 12/2013 | Mehrotra | ............ | H04L 12/4641 709/203 |
| 9,241,044 B2 * | 1/2016 | Shribman | ........... | H04L 67/2838 |
| 9,451,032 B2 * | 9/2016 | Scott | ....................... | H04L 67/16 |
| 9,473,576 B2 * | 10/2016 | Mosko | .................... | H04L 67/16 |

(Continued)

*Primary Examiner* — Jimmy H Tran
(74) *Attorney, Agent, or Firm* — Shun Yao; Park, Vaughan, Fleming & Dowler LLP

(57) ABSTRACT

Embodiments described herein provide a system. The system stores, in a storage device, a first and a second data structures. The first data structure maps a logical Internet Protocol (IP) address of a device to a site IP address of the device at a customer site. The second data structure maps the logical IP address to a message queue (MQ) name identifying a queue, which is associated with the customer site and facilitated by a message queuing service. During operation, the system identifies a command packet for the device. The destination address of the command packet can be the logical IP address. The system then replaces, in the command packet, the logical IP address with the site IP address based on the first data structure to generate a modified packet and forwards an MQ message comprising the modified packet to the queue using the message queuing service.

20 Claims, 11 Drawing Sheets

(56) References Cited

U.S. PATENT DOCUMENTS

| | | | | |
|---|---|---|---|---|
| 9,832,072 | B1* | 11/2017 | Piecuch | H04L 41/0813 |
| 9,882,855 | B1* | 1/2018 | Twitchell | G06F 9/45558 |
| 9,906,947 | B2* | 2/2018 | Stojanovski | H04L 29/12066 |
| 10,009,282 | B2* | 6/2018 | Piecuch | H04L 47/521 |
| 10,091,099 | B2* | 10/2018 | Menon | H04L 67/142 |
| 10,447,710 | B1* | 10/2019 | Li | H04L 61/2007 |
| 2002/0143855 | A1* | 10/2002 | Traversat | G06F 9/4416 709/202 |
| 2003/0233452 | A1* | 12/2003 | Maufer | H04L 29/12018 709/225 |
| 2004/0093434 | A1* | 5/2004 | Hovell | H04L 29/06 709/249 |
| 2004/0205253 | A1* | 10/2004 | Arndt | G06F 12/1491 710/1 |
| 2004/0215848 | A1* | 10/2004 | Craddock | H04L 67/1097 710/39 |
| 2006/0045068 | A1* | 3/2006 | Wu | H04L 29/12009 370/352 |
| 2007/0248085 | A1* | 10/2007 | Volpano | H04L 12/4679 370/389 |
| 2008/0201486 | A1* | 8/2008 | Hsu | H04L 63/0272 709/238 |
| 2008/0304482 | A1* | 12/2008 | Grassi | H04L 29/12358 370/389 |
| 2011/0103387 | A1* | 5/2011 | Jayasenan | H04L 29/12009 370/392 |
| 2015/0341309 | A1* | 11/2015 | Babu | H04L 29/12377 709/226 |
| 2016/0087933 | A1* | 3/2016 | Johnson | H04W 4/70 709/245 |
| 2017/0264974 | A1* | 9/2017 | Harrison | H04L 63/10 |
| 2017/0346707 | A1* | 11/2017 | Menon | H04L 61/2521 |
| 2018/0225230 | A1* | 8/2018 | Litichever | G06F 9/45504 |
| 2019/0222619 | A1* | 7/2019 | Shribman | H04L 65/4084 |
| 2019/0394164 | A1* | 12/2019 | Moonen | H04L 63/029 |

* cited by examiner

CLOUD-BASED DEVICE MANAGER BASED ON MESSAGE QUEUES

BACKGROUND

Field

This disclosure is generally related to the field of distributed device management. More specifically, this disclosure is related to a system and method for facilitating a cloud-based device manager.

Related Art

The proliferation of the Internet and e-commerce continues to create a vast amount of digital content. An enterprise or large corporation may include a network of managed devices, such as cloud storage devices and printers, distributed across multiple sites. In such a network of devices, a device manager may manage the devices in a local network of one of the sites. A conventional device manager typically manages devices based on, e.g., a Simple Network Management Protocol (SNMP) query, which is based on the Internet Protocol (IP) addresses of the managed devices. However, each device can be assigned an IP address by a Dynamic Host Configuration Protocol (DHCP) server based on a local address pool (e.g., from a set of private IP addresses). To facilitate access to the devices in a private network, the device manager conventionally resides within the same network, such as the same private IP sub-network and the local area network (LAN).

If the device manager operates as a cloud service (e.g., via the Internet), the device manager may not be able to access the device using the private IP address. Similarly, if the device is physically unplugged or moved onto a new sub-network (creating a new private IP address for the device), the device manager may not be able to access the device using the new IP address. In addition, multiple clients subscribing to the device management service may use overlapping private IP addresses. Therefore, based on the private IP addresses, the device manager may not be able to distinguish between two devices that have the same private IP address but belong to different clients. Modifying a device manager to address these issues can require development of a new device manager, which can be expensive and inefficient.

While a device manager brings many desirable features to device management, some issues remain unsolved in operating the existing device management service as a cloud service.

SUMMARY

Embodiments described herein provide a system for facilitating a cloud-based device management service. The system stores, in a storage device of a computer system, a first data structure and a second data structure. A first entry in the first data structure maps a logical Internet Protocol (IP) address of a device to a site IP address of the device at a customer site. A second entry in the second data structure maps the logical IP address to a message queue (MQ) name identifying a queue, which is associated with the customer site and facilitated by a message queuing service. During operation, the system identifies a command packet comprising a management command issued by a device manager for the device. The destination address of the command packet can be the logical IP address. The system then replaces, in the command packet, the logical IP address with the site IP address based on the first data structure to generate a modified packet and forwards an MQ message comprising the modified packet to the queue using the message queuing service.

In a variation on this embodiment, the system determines the queue for the MQ message by obtaining the MQ name from the second data structure based on the logical IP address.

In a variation on this embodiment, the MQ message is encrypted based on Transport Layer Security (TLS) protocol.

In a further variation, the TLS facilitates one or more of: (i) authenticating an MQ manager at the customer's site; and (ii) applying a service authorization based on a cryptographic identity.

In a variation on this embodiment, the device manager is a printer management system and the device is a printer.

In a variation on this embodiment, the system forwards the MQ message by one or more of: encapsulating the modified packet with an encapsulation header corresponding to the queue, and determining the queue by operating as an MQ broker of the message queuing service.

In a variation on this embodiment, the first and second entries are based on one or more of: a subnet-based mapping and an individual IP address-based mapping.

In a variation on this embodiment, the system facilitates a firewall service to one or more of: management traffic and traffic associated with the logical IP address and the site IP address.

Embodiments described herein provide a system for facilitating a cloud-based device management service. The system stores, in a storage device of a computer system, a data structure that maps a first IP address of a device manager to a second IP address of the computer system. During operation, the system determines whether a packet from a device is destined to a device manager managing the device. The destination address of the packet is the second IP address. If the packet is destined to the device manager, the system replaces, in the packet, the second IP address with the first IP address based on the data structure to generate a modified packet. The system then forwards an MQ message comprising the modified packet to a queue corresponding to the device manager using a message queuing service.

In a variation on this embodiment, the system identifies a command packet that includes a management command issued by the device manager for the device. The source address of the command packet is the first IP address. The system then replaces, in the command packet, the first IP address with the second IP address based on the data structure and forwards the command packet to the device based on a destination address of the command packet.

In a variation on this embodiment, the MQ message is encrypted based on Transport Layer Security (TLS) protocol.

In a further variation, the TLS facilitates one or more of: (i) authenticating an MQ manager at the customer's site; and (ii) applying a service authorization based on a cryptographic identity.

In a variation on this embodiment, the device manager is a printer management system and the device is a printer.

In a variation on this embodiment, the system forwards the MQ message by one or more of: encapsulating the modified packet with an encapsulation header corresponding to the queue, and determining the queue by operating as an MQ broker of the message queuing service.

In a variation on this embodiment, the system determining whether the packet is destined to the device manager is based on a set of rules. The set of rules includes one or more of: a network address translation (NAT) rule that matches a rule of a reverse direction of the packet, a port address translation (PAT) rule that matches a rule of a reverse direction of the packet, and a signature rule that matches a packet signature.

In a variation on this embodiment, the data structure is based on NAT or PAT.

In a variation on this embodiment, the system maintains a state for a respective packet destined to the second IP address such that the packet can be sent back to the device manager.

Embodiments described herein provide a system for facilitating a cloud-based device management service. During operation, the system, which provides the device management service, scans a customer's site to discover a device to manage and a site IP address of the device. The system allocates a logical IP address to the device and generates a mapping between the logical IP address and the site IP address. The system then provides the mapping to a management device in a same private network of the computer system. The management device facilitates address translation and message queuing services in the private network. The system can issue a management command for the device using the logical address. The site IP address is allowed to conflict with a second site address of a second device at a second site.

In a variation on this embodiment, the scan is a subnet scan that discovers a respective device in the subnet.

In a variation on this embodiment, the system receives a device message with a destination address corresponding to an IP address of the computer system in the private network. The device message can be one of: a response message to the management command and an unsolicited message to the device management service.

BRIEF DESCRIPTION OF THE FIGURES

In the figures, like reference numerals refer to the same figure elements.

DETAILED DESCRIPTION

Figure 1A:
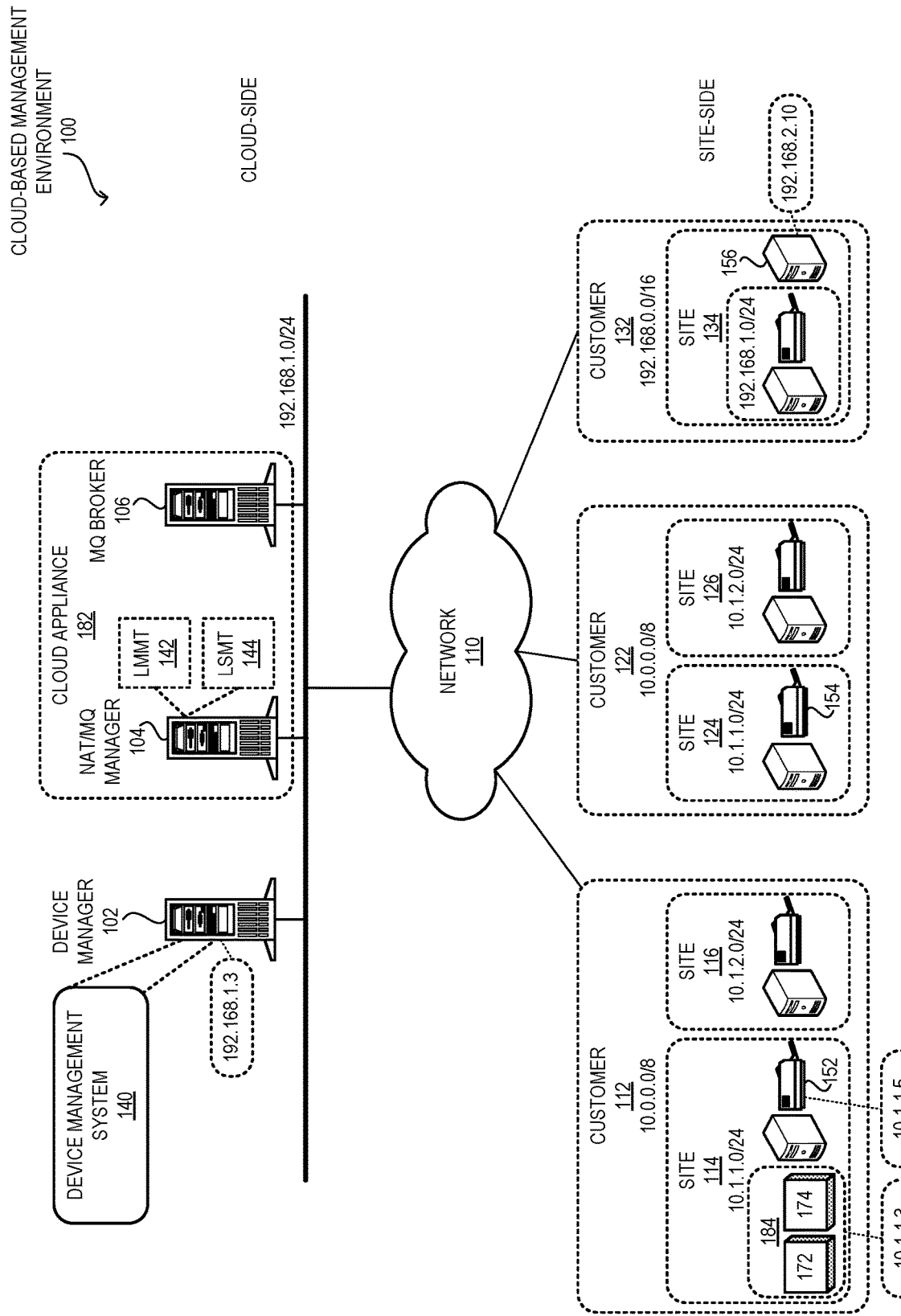
FIG. 1A illustrates an exemplary cloud-based device management environment, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of facilitating cloud-based device management for devices with private IP addresses by (i) using logical IP addresses to issue commands for the devices; (ii) using a network address translation (NAT) service to convert the logical IP addresses to the corresponding private IP addresses; and (iii) using a message queue (MQ) service to transport commands from cloud-side to site-side.

In a device management environment (e.g., a managed printer environment), a device manager discovers and controls managed devices. The device manager can use a number of protocols, such as Internet Control Message Protocol (ICMP), Simple Network Management Protocol (SNMP), and different variants of Hypertext Transfer Protocol (HTTP). With existing technologies, a device manager can use direct network operations on a customer's network at a customer site. A customer network typically uses private IP addresses, such as 192.168.0.0/24 or 10.1.0.0/24. Moreover, multiple customers can use overlapping private IP addresses or the same customer may use overlapping private IP addresses across multiple sites. As a result, issuing management commands directly to a private IP address restricts the device manager within that private network.

Furthermore, even when address translation services, such as NAT, are used to access the cloud (e.g., the Internet), the device manager may not be able to distinguish among addresses of multiple customers. In addition, a customer's private IP addresses may overlap with the private IP addresses of the cloud network that provides device management. Hence, the device manager may not be able to issue a management command from a cloud (e.g., via the Internet).

To solve these problems, embodiments described herein provide a device management system to operate from a cloud-based management environment (e.g., a network that is accessible via the Internet). The device management system can operate on a device manager capable of managing one or more managed devices in a customer network. The device manager can issue management commands, such as control commands, for devices of different customers, each with one or more sites, using logical IP addresses representing the devices. Both the cloud-side (e.g., the cloud host network and its devices) and site-side (e.g., the customer network and its devices) can include network address translation (NAT) for address translation between a logical IP address and the corresponding device IP address. This allows the device manager to issue management commands even when customer sites use private IP addresses with overlapping private IP assignments using conventional network protocols. For example, the device manager can scan a specific customer subnet (e.g., a private IP subnet), discover a device, and manage the device accordingly.

The communication between the cloud-side and the site-side can be based on message queuing. The site-side can include a "site appliance" to host the message queue (MQ) functionality on the customer's site. This appliance can be a new device or embedded on any other device, such as a managed device, at the site. This appliance can also be part of a distributed system that can execute an instance of the device manager. Each site can include one or more appliances. For example, a site can include standby appliances to facilitate high availability. The cloud-site can also include a similar "cloud-appliance" to host the MQ functionality on the cloud environment. The cloud appliance and the site appliance can further host the cloud-side NAT service and the site-side NAT service, respectively. In this way, the same appliance can run a NAT/MQ manager that can provide both NAT and MQ functionality.

During operation, the device manager issues a management command and includes the command in a command packet with a logical IP address of a device of a customer site as a destination address. The NAT/MQ manager on the cloud-side appliance changes the logical IP address to the site IP address of the device. An MQ broker at the cloud-side then encapsulates the updated management packet using MQ encapsulation to generate an MQ message and transports the MQ message to a queue corresponding to the site. An MQ broker at the site-side retrieves the MQ message from the queue, retrieves the command packet, and provides the command packet to the NAT/MQ manager at the site-side. The NAT/MQ manager changes the source IP address of the packet to a local IP address of the site-side appliance and delivers the updated packet to the device. In this way, a cloud-based device manager can issue a command to a device with a private IP address and the device considers the command to be generated within the local network.

Exemplary System

FIG. 1A illustrates an exemplary cloud-based device management environment, in accordance with an embodiment of the present application. Typically, a device manager 102 discovers and controls managed devices. Device manager 102 can use a number of protocols, such as ICMP, SNMP, and variants of HTTP. A customer 112 can have two sites 114 and 116 that use private site IP addresses of IP subnets 10.1.1.0/24 and 10.1.2.0/24, respectively. Another customer 122 can have two sites 124 and 126 that use private site IP addresses of IP subnets 10.1.1.0/24 and 10.1.2.0/24, respectively; and customer 132 can have a site 134 that uses private site IP addresses of IP subnet 192.168.1.0/24.

With existing technologies, a device manager can use direct network operations on a customer's network at a customer site, such as site 114 or 124. In other words, a device manager typically used to manage only one site of a customer. This limits the operations of the device manager within a site. As a result, the same device manager is not used to manage devices in multiple sites of different customers. Even if device manager 102 operates in a cloud environment that a respective customer site accesses via a network 110 (e.g., a local or a wide area network), device manager 102 may not be able to resolve IP address conflicts due to overlapping private IP subnets at different sites.

Suppose that device manager 102 is in a private network with an IP subnet 192.168.1.0/24. In this example, sites 114 and 124 conflict for subnet 10.1.1.0/24, and sites 116 and 126 conflict for subnet 10.1.2.0/24. Even though site 134 uses a different subnet 192.168.1.0/24, this subnet still conflicts with the private subnet of device manager 102. Because of the conflict, device manager 102 may not be able to issue a management command based on the site IP addresses of the managed devices. If device 152 at site 114 of customer 112 and device 154 at site 124 of customer 122 have the same private IP address, device manager 102 would not be able to issue a typical management command for devices 152 and 154 due to address conflict. Even when address translation services, such as NAT, are used, device manager 102 may not be able to distinguish between addresses of customers 112 and 122.

To solve these problems, a device management system 140 operates from a cloud-based management environment 100. Device management system 140 can operate on device manager 102 and allow device manager 102 to facilitate cloud-based device management based on message queuing. Device manager 102 can issue management commands, such as control commands, for devices of different customers 112, 122, and 132. Both the cloud-side and site-side can include NAT for address translation between a logical IP address and the corresponding site IP address. This allows device manager 102 to issue management commands even when customer sites, such as 114 and 124, use private IP addresses using conventional network protocols.

The communication via network 110 between the cloud-side and the site-side can be based on message queuing. On the site-side, a respective site can include a site appliance to host MQ functionality. For example, site 114 can include a site appliance 184, which can be a new device or embedded on any other device in site 114. Appliance 184 can also be part of a distributed system that can execute an instance of device management system 140. Site 114 can also include a standby appliance that can provide high availability to appliance 184. The cloud-site can also include a similar cloud appliance 182 to host the MQ functionality on environment 100. Appliances 182 and 184 can host the cloud-side NAT service and the site-side NAT service, respectively. In this way, appliance 182 can run a NAT/MQ manager 104 that can provide both NAT and MQ functionality to the cloud-side, and appliance 184 can run a NAT/MQ manager 174 that can provide both NAT and MQ functionality to site 114.

During operation, device manager 102 can scan site 114 to discover one or more managed devices, such as device 152, in site 114. To do so, device manager 102 can scan the entire IP subnet, which is 10.1.1.0/24 in this example, of site 114. This subnet-based scan allows device manager 102 to discover a respective device that is to be managed in that subnet. Device manager 102 can discover device 152 and the corresponding IP address of device 152. The IP address of a device at a customer site can be referred to as a site IP address. Device manager 102 can then allocate a logical IP address to device 152. In some embodiments, a user (e.g., an administrator) can allocate the logical IP address. Device manager 102 then generates a mapping between the logical IP address and the corresponding site IP address for device 152.

In some embodiments, device manager 102 indicates network segments using logical IP addresses. Device manager 102 can maintain a one-to-one mapping for the allocation of logical IP addresses such that a respective logical IP subnet corresponds to the site IP subnet for a customer. For example, if device manager 102 uses a one-to-one mapping, device manager 102 can map a /16 logical IP subnet to a /16 site IP subnet or a /24 logical IP subnet to a /24 site IP subnet. For example, since site 114 is configured with site IP subnet 10.1.1.0/24, device manager 102 can map a /24 logical IP subnet to it. Here, the low-order bits are masked as the host addresses. It should be noted that other types of mappings are also possible, such as a static mapping of a particular device's site IP address to a particular logical IP address. For example, device manager 102 can map device 156's IP address (e.g., 198.168.2.10), which can be outside of the site IP subnet designated for site 134, to a corresponding logical IP address (e.g., 172.16.6.5). Device manager 102 can maintain a logical IP address space as large as the site IP address space to facilitate device discovery via network scans.

Device manager 102 then provides the mapping between the logical IP addresses and the corresponding device IP addresses to NAT/MQ manager 104. NAT/MQ manager 104 can store the mapping in a Logical IP address to Site IP address Mapping Table (LSMT) 144. If the mapping is a one-to-one mapping, LSMT 144 maintains a one-to-one correspondence between the host segments of a logical IP address and a site IP address. For example, if an entry in LSMT 144 maps logical IP subnet 172.16.1.0/24 to site IP subnet 10.1.1.0/24, a logical IP address 172.16.1.5 corresponds to a site IP address 10.1.1.5. To facilitate MQ-based communication using logical IP addresses, the device manager also provides the mapping between the logical IP addresses and the corresponding MQ names to NAT/MQ manager 104. NAT/MQ manager 104 can store the mapping in a Logical IP address to MQ name Mapping Table (LMMT) 142. A respective entry of LMMT 142 can map a logical IP subnet to a corresponding MQ name that represents a queue of an MQ service for site 114.

To issue a management command for device 152 at site 114, device manager 102 generates the command and includes the command in a command packet. The source IP address of the packet can correspond to a cloud-side private IP address (allocated to device manager 102 (e.g., 192.168.1.3). The destination IP address of the packet can correspond to a logical IP address allocated to device 152 (e.g., 172.16.1.5). Cloud appliance 182 receives the packet and NAT/MQ manager 104, which runs on appliance 182, performs a lookup in LSMT 144 using logical IP address 172.16.1.5 to obtain the site IP address (e.g., 10.1.1.5) of device 152 and replaces 172.16.1.5 with 10.1.1.5. NAT/MQ manager 104 can also perform a lookup in LMMT 142 using 172.16.1.5 to obtain the destination MQ name. NAT/MQ manager 104 then encapsulates the modified packet to generate an MQ message based on the MQ name and sends the MQ message to cloud-side MQ broker 106. MQ broker 106 can be co-located with NAT/MQ manager 104 in appliance 182 or operate on a separate device.

MQ broker 106 uses the MQ infrastructure to send the MQ message to the queue associated with the MQ name. A site-side MQ broker 172 retrieves the MQ message (e.g., based on periodic retrieval) from the queue. MQ broker 172 can be co-located with NAT/MQ manager 174 in appliance 184 or operate on a separate device. NAT/MQ manager 174 then decapsulates and retrieves the inner packet. The destination IP address, 10.1.1.5, of the packet already corresponds to device 152. NAT/MQ manager 174 can use NAT OR port address translation (PAT) to replace the source IP address, 192.168.1.3, of the packet with appliance 184's IP address (e.g., 10.1.1.3). PAT allows multiple socket pairs (e.g., source IP address, source port, destination IP address, and destination IP address) to be multiplexed over a single NAT IP address by using multiple source ports. NAT, on the other hand, translates IP addresses while keeping ports the same.

Figure 1B:
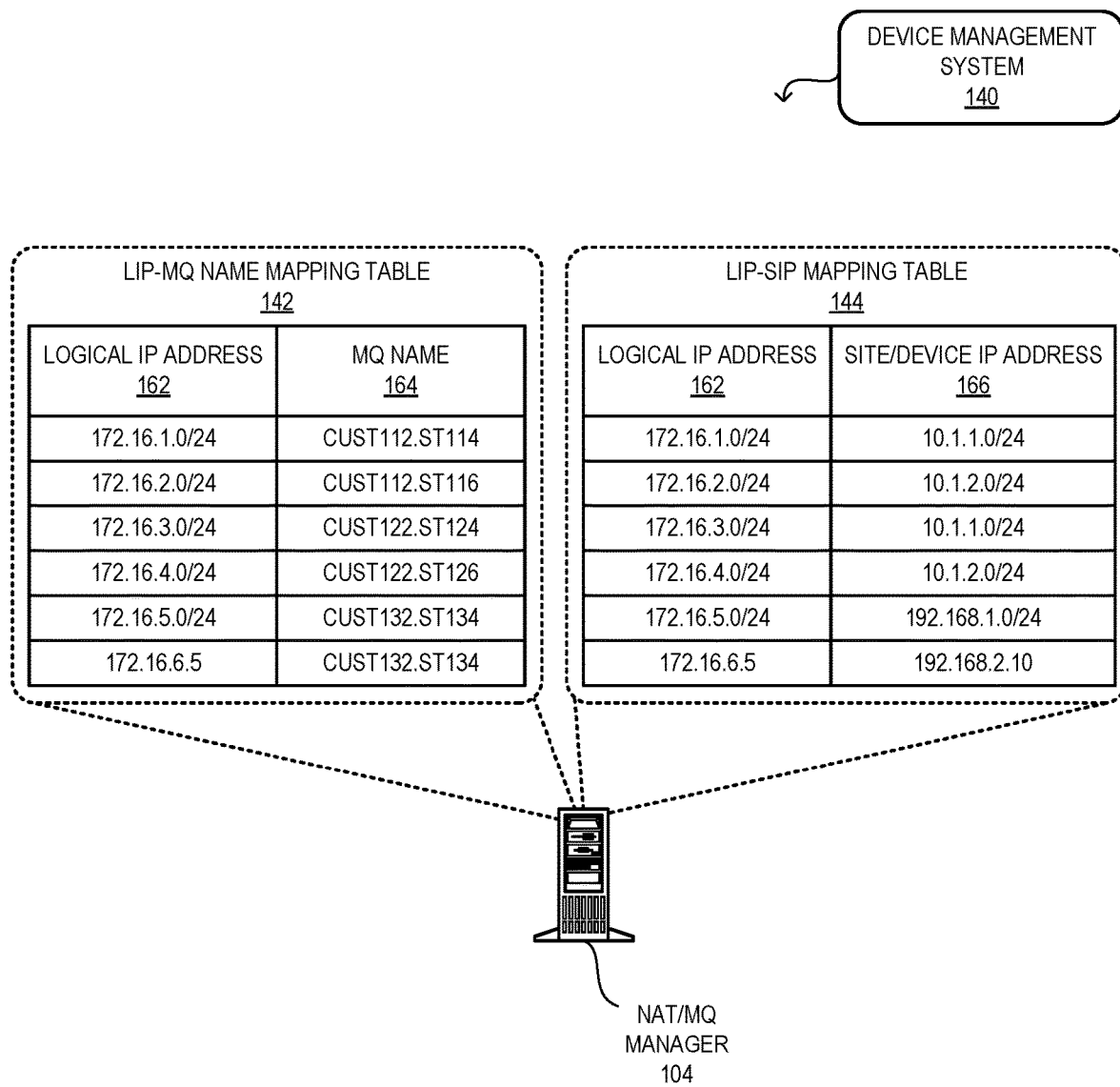
FIG. 1B illustrates exemplary mapping tables for facilitating cloud-based device management, in accordance with an embodiment of the present application.

FIG. 1B illustrates exemplary mapping tables for facilitating cloud-based device management, in accordance with an embodiment of the present application. In this example, NAT/MQ manager 104 maintains LMMT 142 and LSMT 144 in a local memory device. NAT/MQ manager 104 can also maintain these tables as persistent data structures (e.g., as database tables) and/or in a local persistent storage device. LSMT 144 maps logical IP addresses 162 for a respective site to corresponding site IP addresses 166. In some embodiments, LSMT 144 supports both one-to-one mapping between the logical IP subnet and the site IP subnet, and specific address mapping between the logical IP address of a specific device and the corresponding site IP address.

Hence, LSMT 144 can maintain mapping based on subnets, which allows LSMT 144 to map an entire site IP subnet to a logical IP subnet in a single entry. For the one-to-one mapping, LSMT 144 can map logical IP subnet 172.6.5.0/24 of site 134 to corresponding site IP subnet 192.168.1.0/24. Here, the host bits of each IP address in the logical IP subnet correspond to the host bits of the IP address in the site IP subnet. For example, logical IP address 172.6.5.10 is mapped to 192.168.1.10. For the address mapping, LSMT 144 can also map an individual logical IP address 172.6.6.5 to the corresponding site IP address 192.168.2.10.

In addition, LMMT 142 maps logical IP addresses 162 for a respective site to corresponding MQ name 164. An MQ name can identify a queue allocated for a site. In some embodiments, LMMT 142 supports both subnet mapping between a logical IP subnet and an MQ name for the site, and specific address mapping between a logical IP address of a specific device and the corresponding MQ name of the site hosting the device. For the subnet mapping, LMMT 142 can map logical IP subnet 172.6.1.0/24 of site 114 to corresponding MQ name CUST112.ST114 of site 114. Here, any IP address in logical IP subnet 172.6.1.0/24 is mapped to CUST112.ST114. For example, logical IP address 172.6.1.10 is mapped to MQ name CUST112.ST114. For the address mapping, LMMT 142 can also map an individual logical IP address 172.6.6.5 of site 134 to corresponding MQ name CUST132.ST134 of site 134. It should be noted that since the same queue can serve all devices of a site, MQ name CUST132.ST134 of site 134 can be mapped to both logical IP subnet 172.6.5.0/24 and logical IP address 172.6.6.5 associated with site 134.

NAT- and MQ-Based Device Management

Figure 2A:
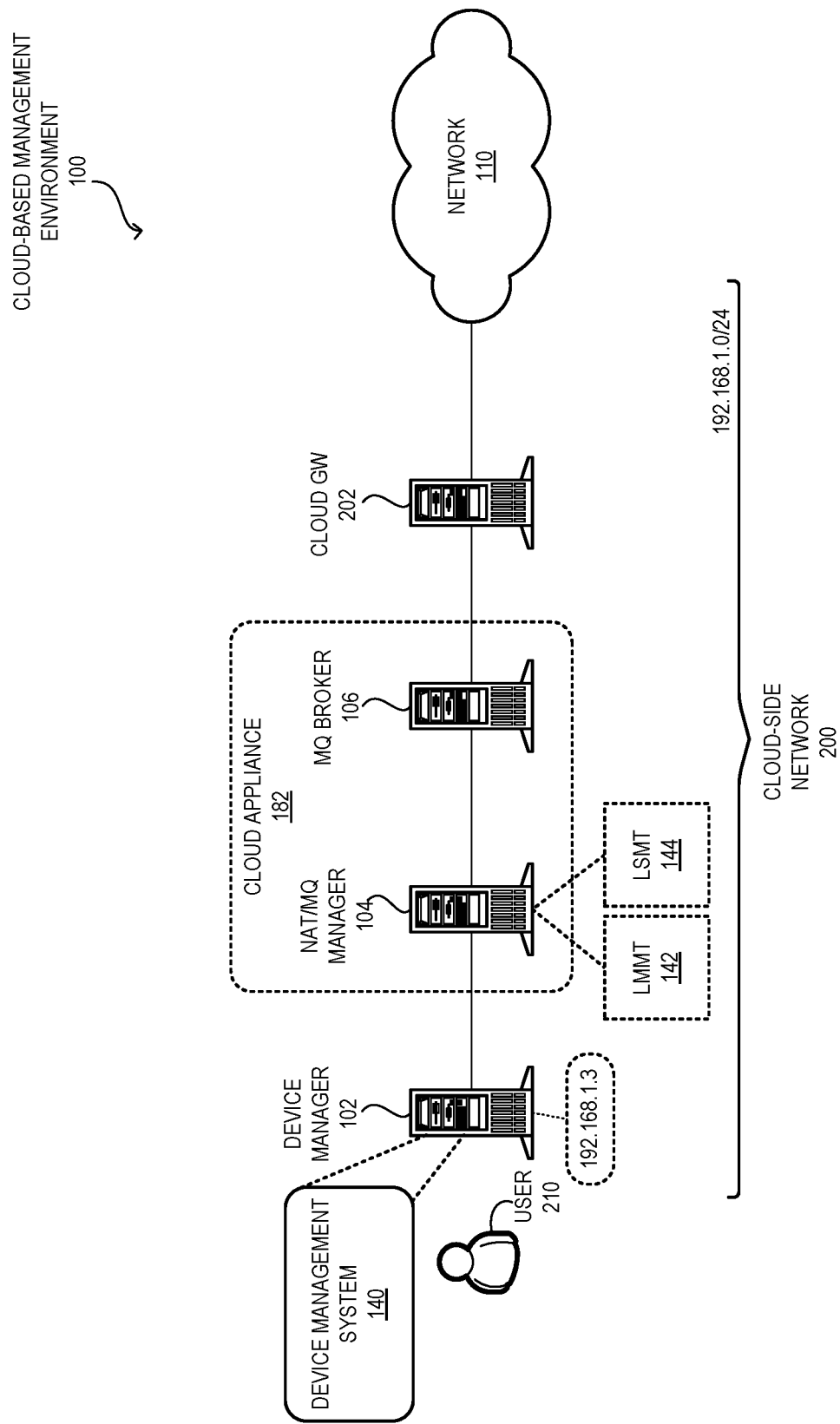
FIG. 2A illustrates an exemplary cloud-side network in a cloud-based device management environment, in accordance with an embodiment of the present application.

FIG. 2A illustrates an exemplary cloud-side network in a cloud-based device management environment, in accordance with an embodiment of the present application. Device manager 102 and appliance 182 can be in cloud-side network 200 (e.g., a local area network (LAN) with a corresponding private IP subnet) of environment 100. Network 200 can be a private network with a private IP subnet 192.168.1.0/24. Device manager 102 and appliance 182 can be configured with IP addresses from IP subnet 192.168.1.0/24. In addition, device manager 102 and appliance 182 can be configured with public IP addresses (e.g., 13.8.1.1 and 13.8.1.2, respectively). Network 200 can also include a cloud gateway 202 (e.g., an Azure gateway) that facilitates firewall and gateway services to network 200.

During operation, device manager 102 can issue a management command (e.g., an interprocess communication (IPC) command). This command can be a command generated by system 140 (e.g., in response to an event at a device) or issued by a user 210 (e.g., to configure the device in a particular way). Device manager 102 then includes the command in a command packet and sets the logical IP address of the device as the destination address. Upon receiving the packet, NAT/MQ manager 104 looks up in LSMT 144 to obtain the corresponding site IP address and changes the logical IP address to the site IP address. NAT/MQ manager 104 also looks up in LMMT 142 to obtain the destination MQ name based on the logical IP address. The packet's source IP address can be device manager 102's private IP address (e.g. 192.168.1.3). NAT/MQ manager 104 then encapsulates the packet with MQ encapsulation based on the MQ name to generate an MQ message. NAT/MQ manager 104 can encrypt the MQ message using Transport Layer Security (TLS) protocol. The TLS-based authentication can mutually authenticate the NAT/MQ managers and/or apply service authorization based on a cryptographic identity.

NAT/MQ manager 104 then sends the MQ message to MQ broker 106, which in turn sends the encapsulated packet to the queue corresponding to the MQ name via network 110. NAT/MQ manager 104 and MQ broker 106 can operate based on a message queuing service. Examples of a message queuing service include, but are not limited to, Microsoft Message Queuing (MSMQ), Amazon Simple Queue Service (SQS), IBM WebSphere MQ, Oracle Advanced Queuing (AQ), StormMQ, and IronMQ. NAT/MQ manager 104 and MQ broker 106 can also use an open source messaging middleware system to facilitate the message queuing service.

Figure 2B:
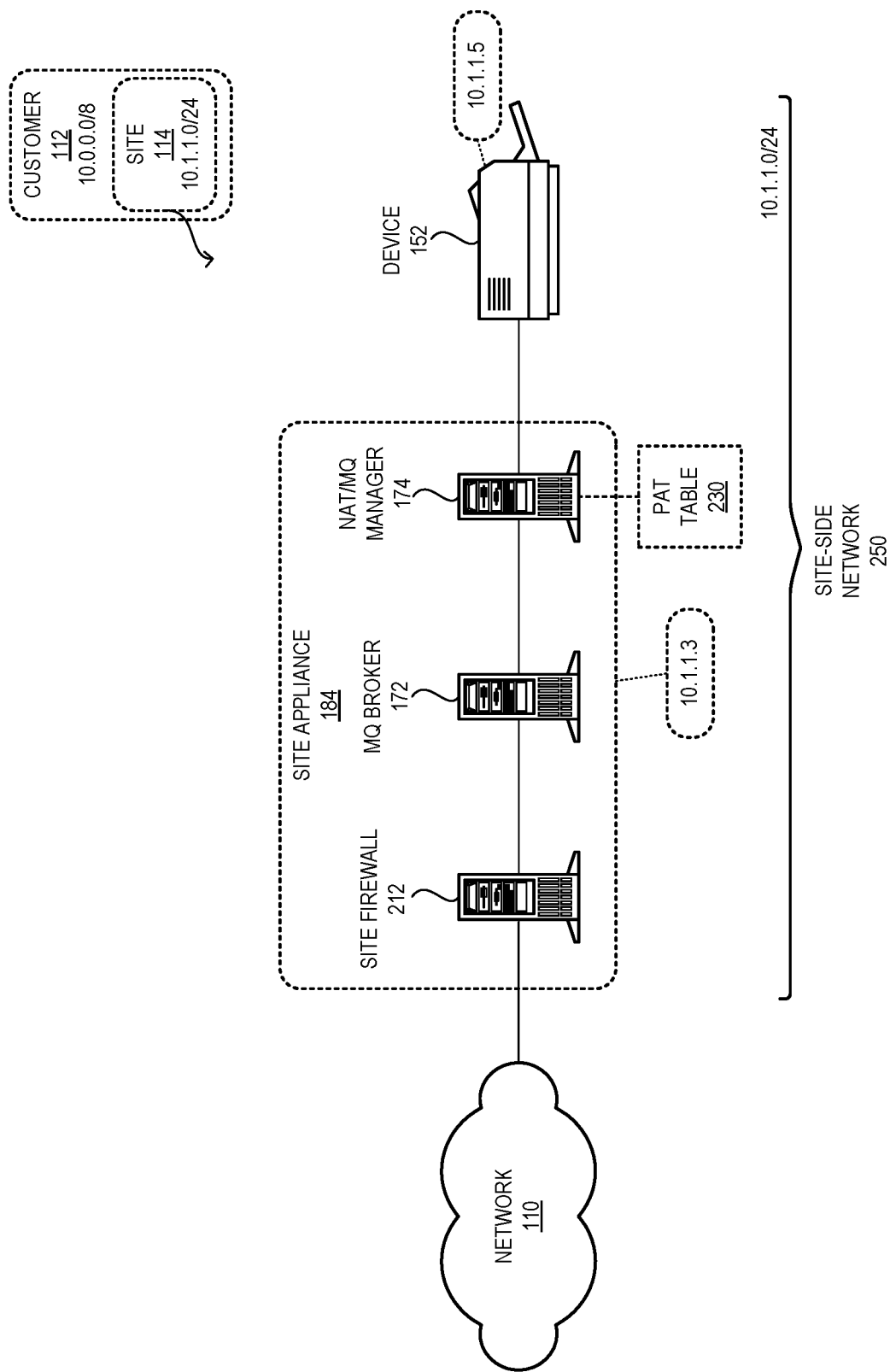
FIG. 2B illustrates an exemplary site-side network in a cloud-based device management environment, in accordance with an embodiment of the present application.

FIG. 2B illustrates an exemplary site-side network in a cloud-based device management environment, in accordance with an embodiment of the present application. At customer 112's site 114, a site-side network 250 (e.g., a LAN with a corresponding private IP subnet) can include a site firewall 212, which can reside on site appliance 184 or in a separate device, for protecting devices in network 250. Site firewall 212 can be configured to allow MQ messages encrypted with TLS protocol into network 250 (e.g., traffic associated with logical and site IP addresses). Site firewall 212 can provide firewall service specific to the type of management traffic and translated addresses used in site 114. MQ broker 172 of site appliance 184 can retrieve an MQ message from a queue associated with site 114. Appliance 184 can decapsulate the MQ message to obtain the inner packet. The destination IP address should be an IP address in the private IP subnet of site 114. For example, if the MQ message is for device 152, the destination address of the packet can be 10.1.1.5, which is in the private IP subnet 10.1.1.0/24 of site 114. Since appliance 184 resides within IP subnet 10.1.1.0/24 and has an IP address in that subnet, appliance 184 can forward the packet using its destination address of 10.1.1.5.

NAT/MQ manager 174 on appliance 184 then processes a port address translation using a NAT table 230 to replace the source IP address of the packet (e.g., 192.168.1.3) with the appliance's IP address (e.g., 10.1.1.3). In some embodiments, NAT table 230 can be a PAT table. Under such circumstances, NAT/MQ manager 174 can be configured to operate based on conventional PAT functionality to facilitate port address translation using NAT table 230. Subsequently, NAT/MQ manager 174 forwards the modified packet to device 152. Since the updated source address of the packet is in the IP subnet of site 114 (e.g., 10.1.1.0/24), the packet would appear as a locally generated packet to device 152. Hence, if device 152 sends a response packet for the received packet, the response would include a destination address corresponding to the IP address of appliance 184 (e.g., 10.1.1.3). Hence, the response packet—even if forwarded via network 250 of site 114—can return to appliance 184.

However, since the devices in site 114 determine that the command packets are sent from appliance 184 (e.g., based on the modified source address), appliance 184 receives the packets intended for device manager 102. NAT/MQ manager 174 can then apply one or more rules to determine whether a packet should be sent to device manager 102. For example, if the packet matches a PAT rule for a reverse direction, NAT/MQ manager 174 considers the packet as a response to a command packet. MQ broker 172 can forward the packet as an MQ reply. On the other hand, if the packet matches one or more packet signatures, such as a destination port of an SNMP trap, NAT/MQ manager 174 considers the packet as an unsolicited notification for device manager 102. MQ broker 172 then forwards the packet based on an MQ name of device manager 102.

Figure 3:
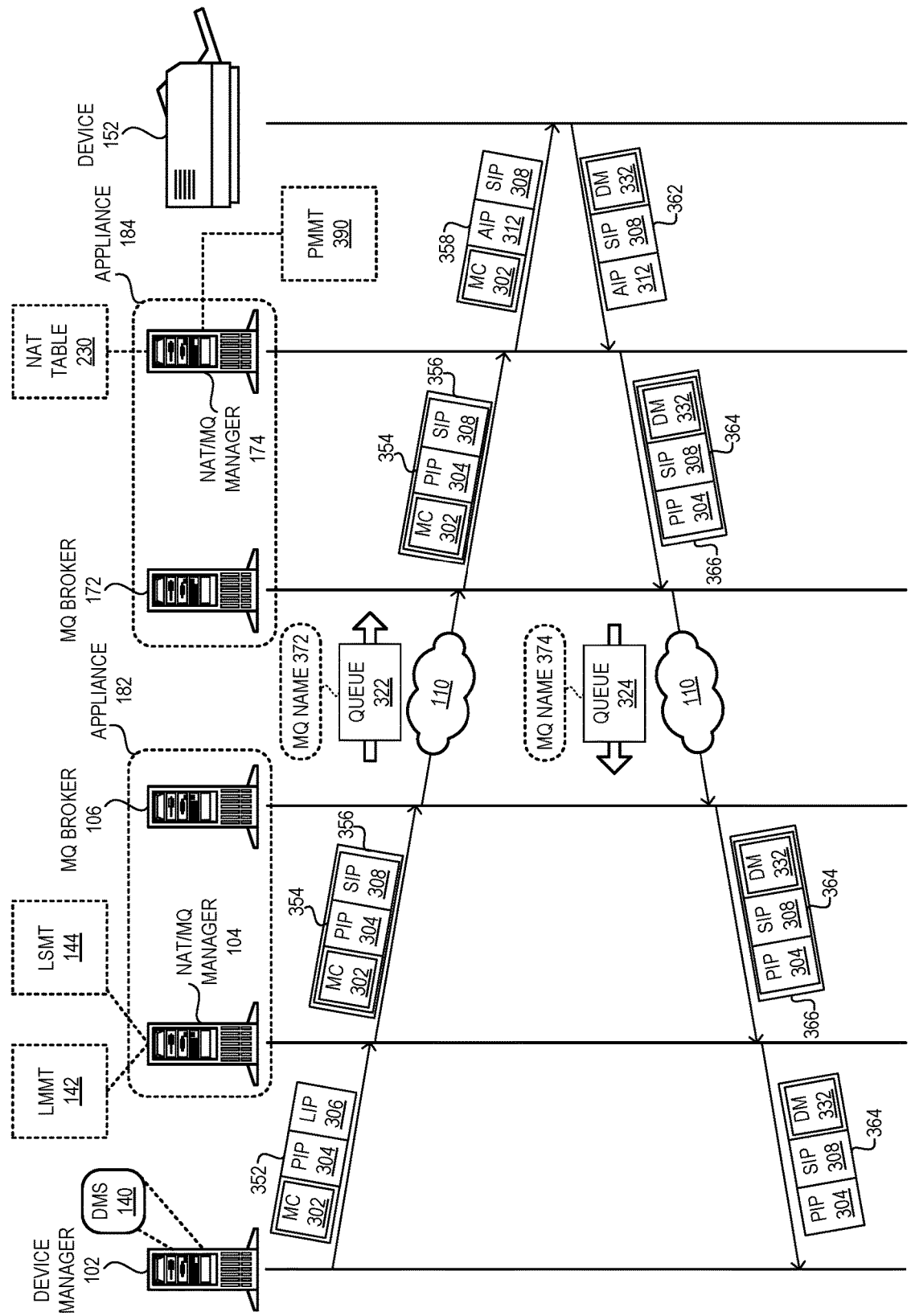
FIG. 3 illustrates an exemplary communication for facilitating cloud-based device management, in accordance with an embodiment of the present application.

FIG. 3 illustrates an exemplary communication for facilitating cloud-based device management, in accordance with an embodiment of the present application. During operation, device manager 102 issues a management command 302 for device 152 and includes command 302 in a command packet 352. The source IP address of packet 352 can correspond to a private IP address 304 of device manager 102 (e.g., 192.168.1.3). The destination IP address of packet 352 can correspond to a logical IP address 306 allocated to device 152 (e.g., 172.16.1.5). Cloud appliance 182 receives packet 352 from the private network at the cloud side. This can be based on packet forwarding with the private IP subnet (e.g., 192.168.1.0/24) in the cloud side.

NAT/MQ manager 104 on appliance 182 performs a lookup in LSMT 144 using logical IP address 306 to obtain site IP address 308 (e.g., 10.1.1.5) of device 152 and replaces logical IP address 306 with site IP address 308 to generate a modified packet 354. NAT/MQ manager 104 can also perform a lookup in LMMT 142 using logical IP address 306 to obtain an MQ name 372. NAT/MQ manager 104 then encapsulates modified packet 354 (e.g., with an encapsulation header) to generate an MQ message 356 and sends MQ message 356 to MQ broker 106. MQ broker 106 can be co-located with NAT/MQ manager 104 in appliance 182 or operate on a separate device.

MQ broker 106 uses the MQ infrastructure to send MQ message 356 to a queue 322 associated with MQ name 372. An MQ broker 172 in appliance 184 retrieves MQ message 356 (e.g., based on periodic retrieval) from queue 322. MQ broker 172 can be co-located with NAT/MQ manager 174 in appliance 184 or operate on a separate device. NAT/MQ manager 174 then decapsulates MQ message 356 and retrieves packet 354. The destination IP address of packet 354, which is site IP address 308, already corresponds to device 152. For example, if site IP address 308 is 10.1.1.5, it is already in the private IP subnet 10.1.1.0/24 of site 114. Since appliance 184 resides within IP subnet 10.1.1.0/24 and has an IP address in that subnet, appliance 184 can forward packet 354 toward device 152 using site IP address 308.

NAT/MQ manager 174 on appliance 184 then uses a port address translation using NAT table 230 to replace the source IP address of packet 354, which is private IP address 304 of device manager 102, with appliance 184's IP address 312 (e.g., 10.1.1.3) to generate modified packet 358. NAT/MQ manager 174 can be configured to operate based on conventional PAT functionality to facilitate port address translation using NAT table 230. Subsequently, NAT/MQ manager 174 forwards packet 358 to device 152. Since appliance 184's IP address 312 is in the IP subnet of site 114 (e.g., 10.1.1.3 is in 10.1.1.0/24), packet 358 would appear as a locally generated packet to device 152. Hence, to send a device message 332 to device manager 102, device 152 include device message 332 in a packet 362 and sets the destination IP address of packet 362 as appliance 184's IP address 312. Hence, packet 362 is forwarded to appliance 184.

As a result, appliance 184 can receive packet 362 even if it is intended for device manager 102. NAT/MQ manager 174 can then apply one or more rules to determine whether packet 362 should be sent to device manager 102. For example, if packet 362 matches a PAT rule for a reverse direction (e.g., a rule that has matched packet 354), NAT/MQ manager 174 considers packet 362 as a response to a management command, such as command 302. Appliance 184 can then forward packet 362 as an MQ reply. On the other hand, if packet 362 matches one or more packet signatures, such as a destination port of an SNMP trap, NAT/MQ manager 174 considers packet 362 as an unsolicited notification for device manager 102. Upon determining that packet 362 should be sent to device manager 102, MQ/NAT manager 174 replaces appliance 184's IP address 312 with private IP address 304 of device manager 102 as the destination address to generate a modified packet 364. In some embodiments, MQ/NAT manager 174 maintains a state for the packets destined to appliance 184's IP address 312 such that packet 362 can be sent back to device manager 102.

To forward packet 364, NAT/MQ manager 174 can obtain an MQ name 374, which can correspond to a queue 324 associated with the cloud side. NAT/MQ manager 174 then encapsulates modified packet 364 to generate an MQ message 366 and sends MQ message 366 to MQ broker 172. MQ broker 172 uses the MQ infrastructure to send MQ message 366 to queue 324 associated with MQ name 374. MQ broker 106 retrieves MQ message 366 from queue 324 and provides MQ message 366 to NAT/MQ manager 104. NAT/MQ manager 104 then decapsulates MQ message 366 and retrieves packet 364. The destination IP address of packet 364, which is private IP address 304, already corresponds to device manager 102. Since appliance 182 resides within IP subnet 192.168.1.0/24 and has an IP address (e.g., 192.168.1.3) in that subnet, NAT/MQ manager 104 forwards packet 364 toward device manager 102 using private IP address 304.

To facilitate MQ-based communication using private IP addresses, NAT/MQ manager 174 can maintain mappings between the private IP addresses and the corresponding MQ names. In some embodiments, NAT/MQ manager 174 maintains the mapping in a Private IP address to MQ name Mapping Table (PMMT) 390. A respective entry of PMMT 390 can map a private IP subnet to a corresponding MQ name that represents a queue of an MQ service for the cloud-side and/or other sites.

Operations

Figure 4:
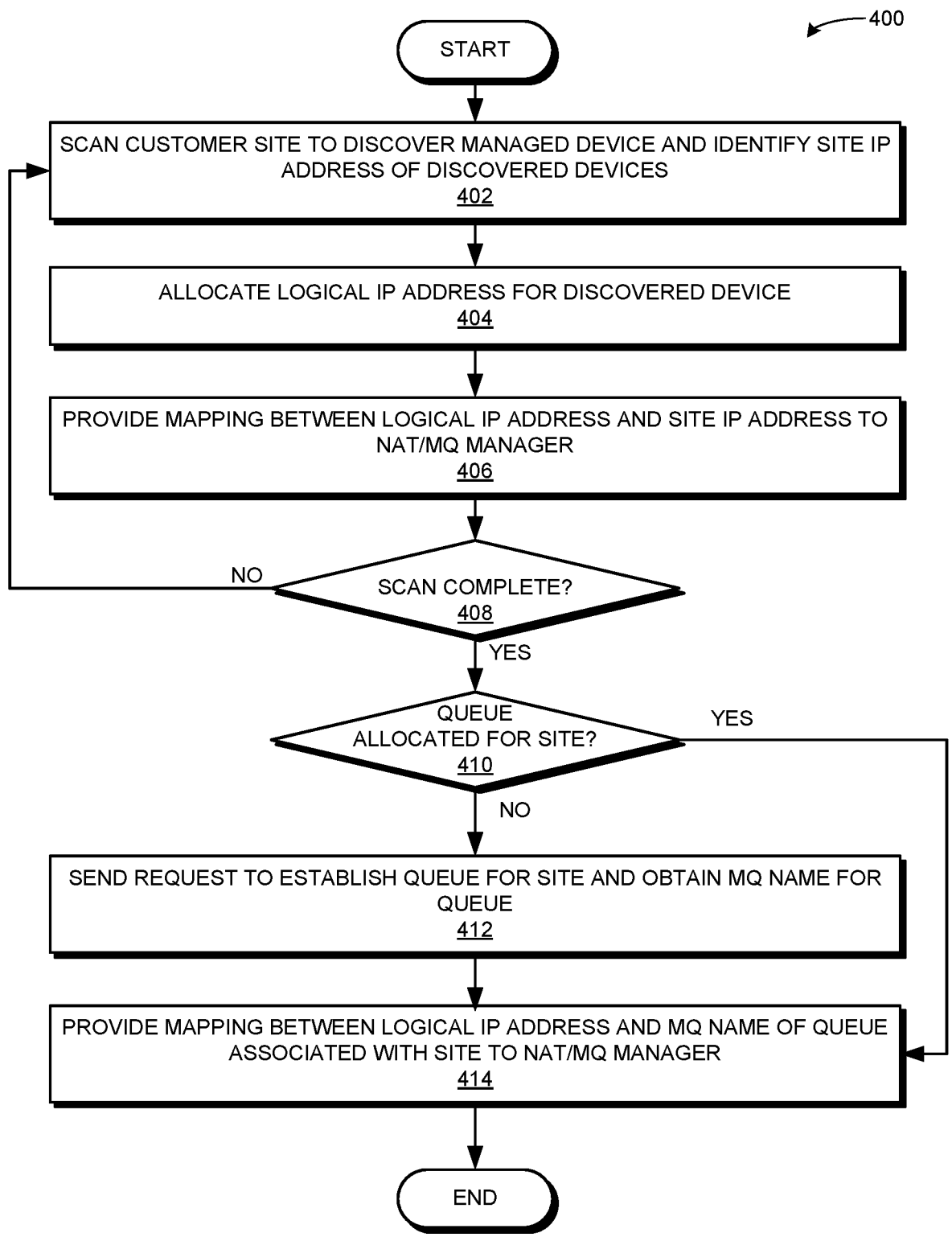
FIG. 4 presents a flowchart illustrating a method of a device management system initializing cloud-based device management, in accordance with an embodiment of the present application.

FIG. 4 presents a flowchart illustrating a method of a device management system initializing cloud-based device management, in accordance with an embodiment of the present application. During operation, the system scans a customer site to discover a managed device and identify the site IP address of the discovered device (operation 402). The system then allocates a logical IP address for the discovered device (operation 404) and provides a mapping between the logical IP address and the site IP address to the NAT/MQ manager (operation 406). The system then determines whether the scan is complete (operation 408). If the scan is not complete, the system continues to scan the customer site to discover another managed device and identify the site IP address of the discovered device (operation 402). If the scan is complete, the system checks whether a queue is allocated for the site (operation 410). If a queue is not allocated, the system can send a request to establish a queue for the site and obtains an MQ name for the queue (operation 412). If a queue is allocated or has been established (operation 410 or 412), the system provides a mapping between the logical IP address and the MQ name of the queue associated with the site to the MQ/NAT manager (operation 414).

Figure 5A:
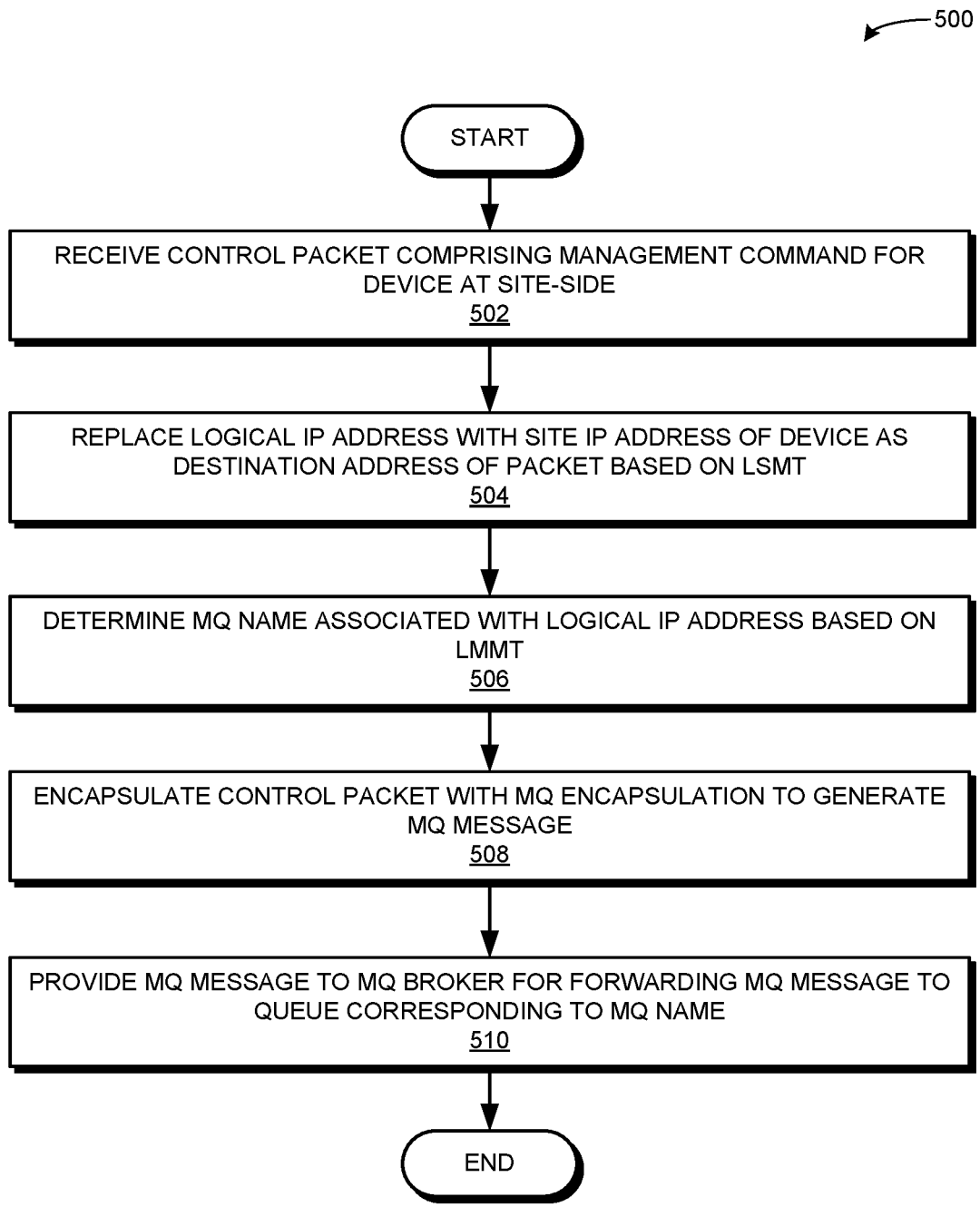
FIG. 5A presents a flowchart illustrating a method of a cloud appliance forwarding a management command from a cloud-based device manager, in accordance with an embodiment of the present application.

FIG. 5A presents a flowchart illustrating a method of a cloud appliance forwarding a management command from a cloud-based device manager, in accordance with an embodiment of the present application. During operation, the appliance receives a control packet comprising a management command for a device at a site-side (operation 502). The appliance then replaces the logical IP address with the site IP address of the device as the destination address of the packet based on the LSMT (operation 504). The appliance determines the MQ name associated with the logical IP address based on the LMMT (operation 506). The appliance encapsulates the control packet with an MQ encapsulation to generate an MQ message (operation 508) and provides the MQ message to the MQ broker for forwarding the MQ message to the queue corresponding to the MQ name (operation 510).

Figure 5B:
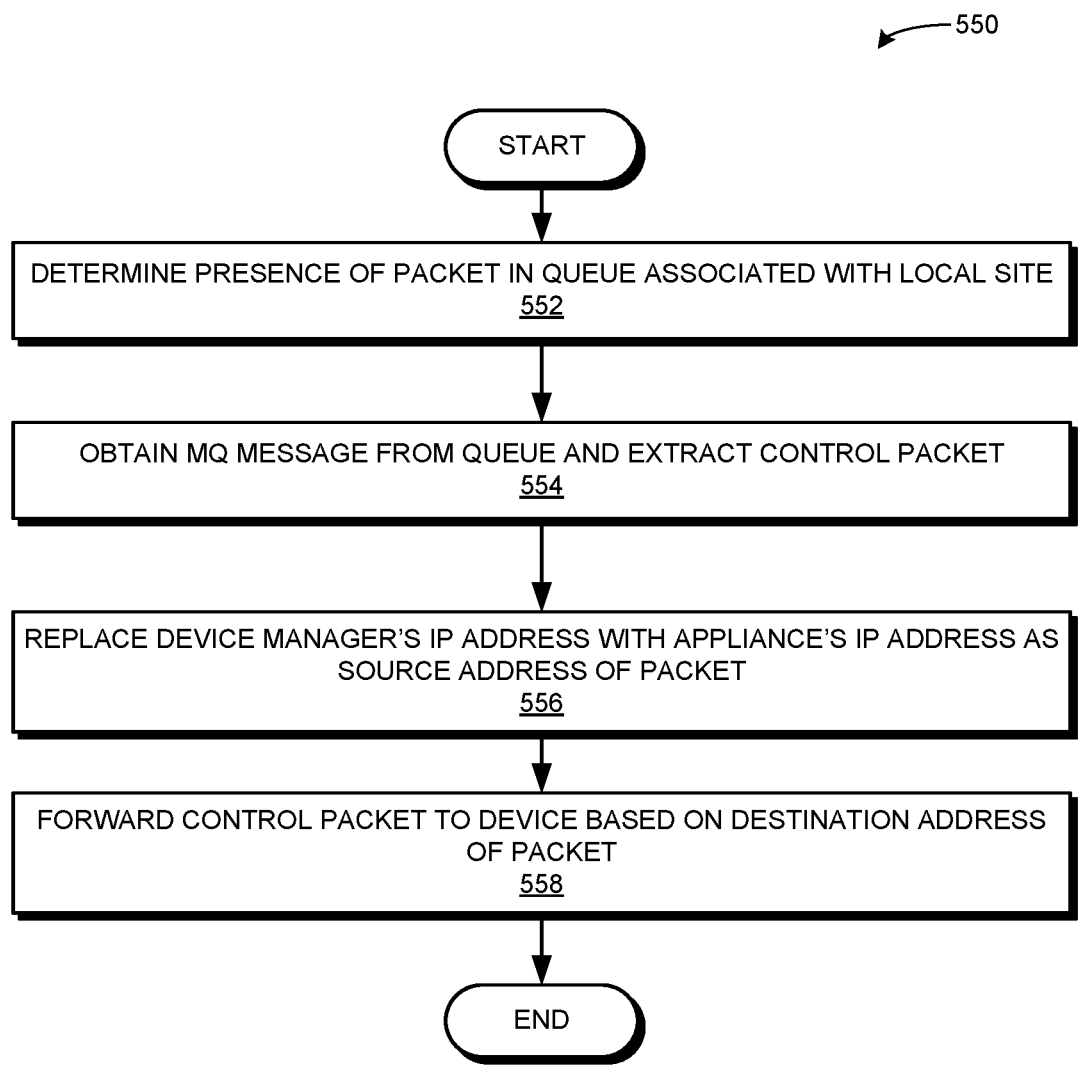
FIG. 5B presents a flowchart illustrating a method of a site appliance forwarding a management command from a cloud-based device manager, in accordance with an embodiment of the present application.

FIG. 5B presents a flowchart illustrating a method of a site appliance forwarding a management command from a cloud-based device manager, in accordance with an embodiment of the present application. During operation, the appliance determines the presence of a packet in a queue associated with the local site (operation 552). The appliance can obtain an MQ message from the queue and extracts a control packet (operation 554). The appliance replaces the device manager's IP address with the appliance's IP address as a source address of the packet (operation 556). The appliance forwards the control packet to a device based on the destination address of the packet (operation 558).

Figure 6:
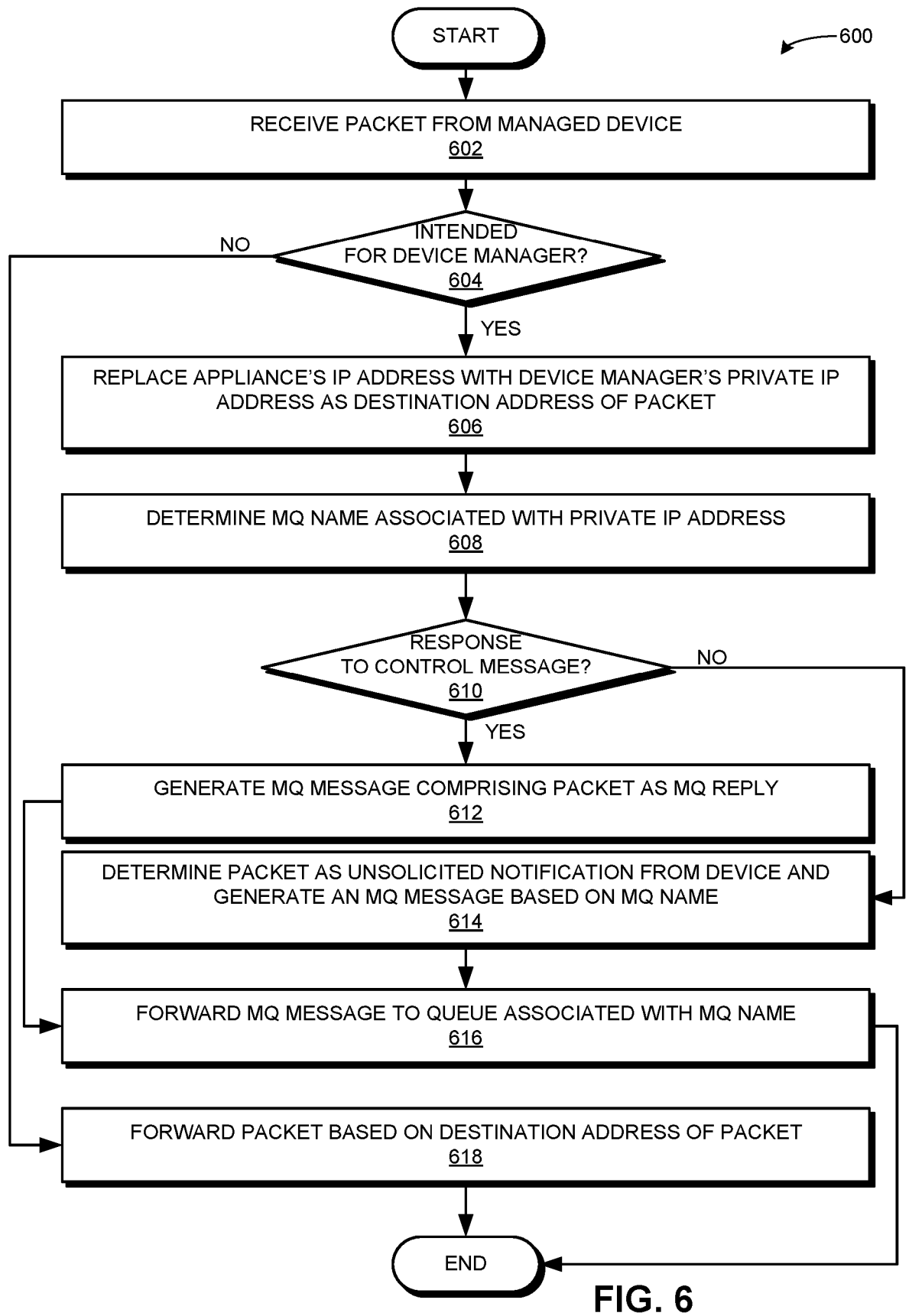
FIG. 6 presents a flowchart illustrating a method of a site appliance forwarding a management command to a cloud-based device manager, in accordance with an embodiment of the present application.

FIG. 6 presents a flowchart illustrating a method of a site appliance forwarding a management command to a cloud-based device manager, in accordance with an embodiment of the present application. During operation, the appliance receives a packet from a managed device (operation 602) and checks whether the packet is intended for the device manager (operation 604). This packet may include the appliance's IP address as a destination address. The appliance can use one or more rules to determine whether the packet is intended for the device manager even if the destination address of the packet corresponds to the appliance. If the packet is intended for the device manager, the appliance replaces the appliance's IP address with the device manager's private IP address as the destination address of the packet (operation 606).

The appliance then determines the MQ name associated with the private IP address (operation 608) and determines whether the packet is a response to the control message (operation 610). If the packet is a response, the appliance generates an MQ message comprising the packet as an MQ reply to the control message (operation 612). Otherwise, the appliance determines the packet as an unsolicited notification from the device and generates an MQ message comprising the packet based on the MQ name (operation 614). Upon generating the MQ message (operation 612 or 614), the appliance forwards the MQ message to the queue associated with the MQ name (operation 616). If the packet is not intended for the device manager (operation 604), the appliance forwards the packet based on the destination address of the packet (operation 618).

Exemplary Computer System and Apparatus

Figure 7:
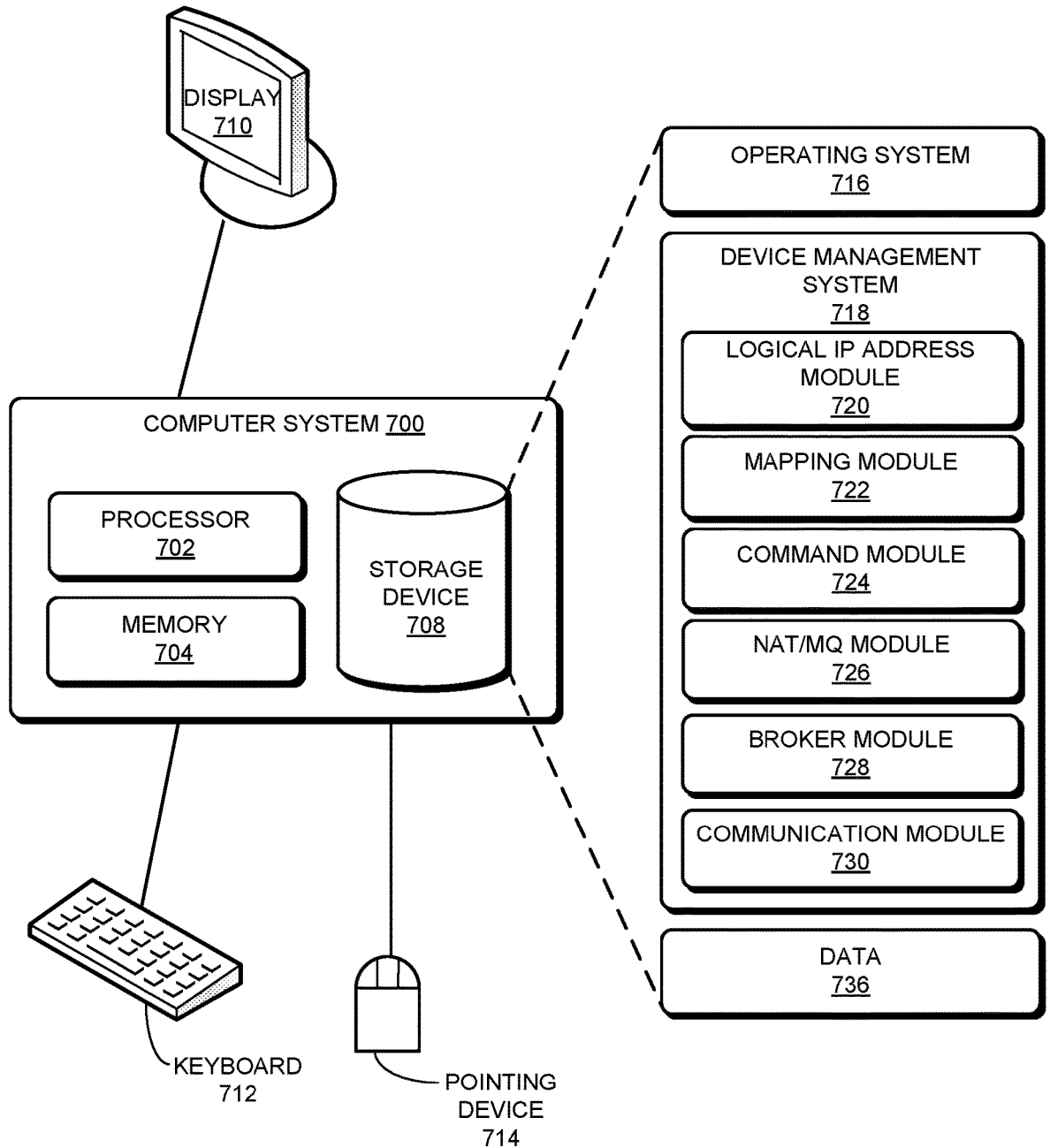
FIG. 7 illustrates an exemplary computer system that facilitates cloud-based device management, in accordance with an embodiment of the present application.

FIG. 7 illustrates an exemplary computer system that facilitates cloud-based device management, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a device management system 718, and data 736. Device management system 718 can facilitate the operations of one or more of: device manager 102, cloud appliance 182, and site appliance 184. Hence, computer system 700 may operate as any of device manager 102, cloud appliance 182, and site appliance 184.

Device management system 718 can include instructions, which when executed by computer system 700 can cause computer system 700 to perform methods and/or processes described in this disclosure. Specifically, device management system 718 can include instructions for discovering managed devices at customer sites and generating logical IP addresses for the devices (logical IP address module 720). Device management system 718 can also include instructions for generating mappings in an LMMT, an LSMT, a PAT table, and a PMMT (mapping module 722). Furthermore, device management system 718 can also include instructions for issuing a management command and/or a device message (command module 724).

In addition, device management system 718 includes instructions for facilitating the operations of a NAT/MQ manager of the cloud-side and/or the site-side (NAT/MQ module 726). Device management system 718 can also include instructions for facilitating the operations of an MQ broker of the cloud-side and/or the site-side (broker module 728). Device management system 718 may further include instructions for sending and receiving messages (communication module 730). Data 736 can include any data that can facilitate the operations of device management system 718. Data 736 may include one or more of: an LMMT, an LSMT, a PAT table, and a PMMT.

Figure 8:
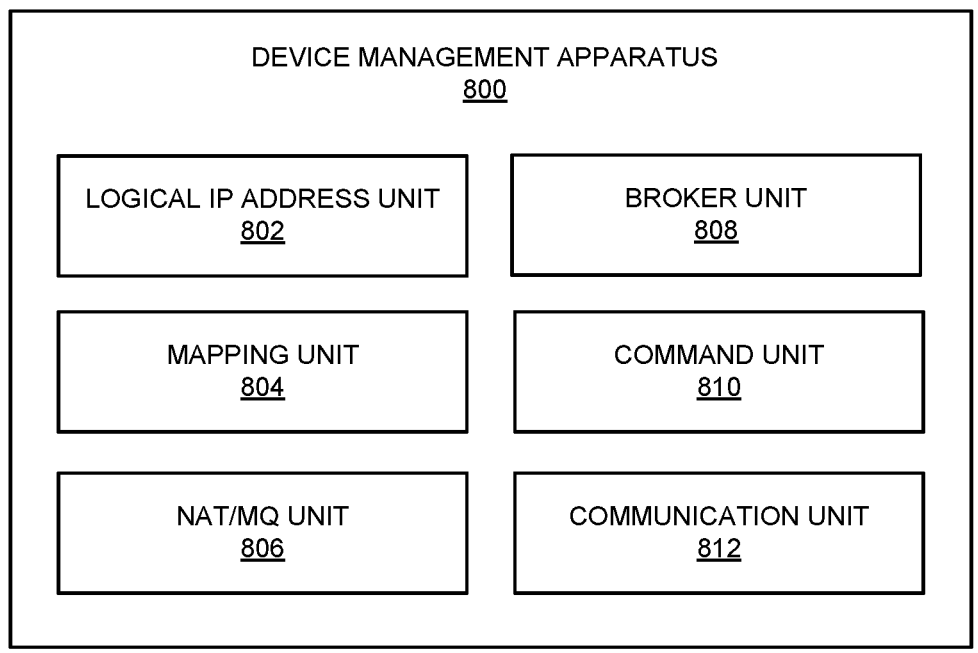
FIG. 8 illustrates an exemplary apparatus that facilitates cloud-based device management, in accordance with an embodiment of the present application.

FIG. 8 illustrates an exemplary apparatus that facilitates cloud-based device management, in accordance with an embodiment of the present application. Device management apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-812, which perform functions or operations similar to modules 720-730 of computer system 700 of FIG. 7, including: a logical IP address unit 802; a mapping unit 804; a NAT/MQ unit 806; a broker unit 808; a command unit 810; and a communication unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating a cloud-based device management service, comprising:
storing, in a storage device of a computer system, a first data structure and a second data structure, wherein a first entry in the first data structure maps a logical Internet Protocol (IP) address of a device to a site IP address of the device at a customer site, and wherein a second entry in the second data structure maps the logical IP address to a message queue (MQ) name identifying a queue, wherein the queue is associated with the customer site and facilitated by a message queuing service;
identifying a command packet comprising a management command issued by a device manager for the device, wherein the destination address of the command packet is the logical IP address;
replacing, in the command packet, the logical IP address with the site IP address based on the first data structure to generate a modified packet;
identifying the queue associated with the MQ name by looking up the logical IP address in the second data structure; and
forwarding an MQ message comprising the modified packet to the identified queue using the message queuing service.

2. The method of claim 1, wherein identifying the queue further comprises obtaining the MQ name from the second data structure based on a mapping between the MQ name and the logical IP address.

3. The method of claim 1, wherein the MQ message is encrypted based on Transport Layer Security (TLS) protocol.

4. The method of claim 3, wherein the TLS facilitates one or more of:
  authentication of an MQ manager at the customer's site; and
  application of a service authorization based on a cryptographic identity.

5. The method of claim 1, wherein the device manager is a printer management system and the device is a printer.

6. The method of claim 1, wherein forwarding the MQ message further comprises one or more of:
  encapsulating the modified packet with an encapsulation header corresponding to the identified queue; and
  operating as an MQ broker of the message queuing service for determining the queue.

7. The method of claim 1, wherein the first and second entries are based on one or more of:
  a subnet-based mapping; and
  an individual IP-address based mapping.

8. The method of claim 1, further comprising facilitating a firewall service to one or more of:
  management traffic; and
  traffic associated with the logical IP address and the site IP address.

9. A method for facilitating a cloud-based device management service, comprising:
  storing, in a storage device of a computer system, a data structure that maps a first IP address of a device manager to a second IP address of the computer system;
  determining whether a packet from a device is destined to a device manager managing the device, wherein the destination address of the packet is the second IP address;
  in response to determining that the packet is destined to the device manager, replacing, in the packet, the second IP address with the first IP address based on the data structure to generate a modified packet;
  identifying a queue, which corresponds to the device manager and is associated with a message queue (MQ) name, based on a mapping between the second IP address and the MQ name; and
  forwarding an MQ message comprising the modified packet to the queue corresponding to the device manager using a message queuing service.

10. The method of claim 9, further comprising:
  identifying a command packet comprising a management command issued by the device manager for the device, wherein the source address of the command packet is the first IP address;
  replacing, in the command packet, the first IP address with the second IP address based on the data structure; and
  forwarding the command packet to the device based on a destination address of the command packet.

11. The method of claim 9, wherein the MQ message is encrypted based on Transport Layer Security (TLS) protocol.

12. The method of claim 11, wherein the TLS facilitates one or more of:
  authentication of an MQ manager at the customer's site; and
  application of a service authorization based on a cryptographic identity.

13. The method of claim 9, wherein the device manager is a printer management system and the device is a printer.

14. The method of claim 9, wherein forwarding the MQ message further comprises:
  encapsulating the modified packet with an encapsulation header corresponding to the identified queue; and
  operating as an MQ broker of the message queuing service for determining the queue.

15. The method of claim 9, wherein determining whether the packet is destined to the device manager comprises processing the packet based on a set of rules that includes one or more of:
  a network address translation (NAT) rule that matches a rule of a reverse direction of the packet;
  a port address translation (PAT) rule that matches a rule of a reverse direction of the packet; and
  a signature rule that matches a packet signature.

16. The method of claim 9, wherein the data structure is based on NAT or PAT.

17. The method of claim 9, further comprising maintaining a state for a respective packet destined to the second IP address such that the packet can be sent back to the device manager.

18. A non-transitory computer-readable storage medium storing instructions that when executed by a computer cause the computer to perform a method for facilitating a cloud-based device management service, the method comprising:
  storing, in a storage device of a computer system, a first data structure and a second data structure, wherein a first entry in the first data structure maps a logical Internet Protocol (IP) address of a device to a site IP address of the device at a customer site, and wherein a second entry in the second data structure maps the logical IP address to a message queue (MQ) name identifying a queue, wherein the queue is associated with the customer site and facilitated by a message queuing service;
  identifying a command packet comprising a management command issued by a device manager for the device, wherein the destination address of the command packet is the logical IP address;
  replacing, in the command packet, the logical IP address with the site IP address based on the first data structure to generate a modified packet;
  identifying the queue associated with the MQ name by looking up the logical IP address in the second data structure; and
  forwarding an MQ message comprising the modified packet to the identified queue using the message queuing service.

19. The method of claim 1, wherein the MQ message is encrypted based on Transport Layer Security (TLS) protocol.

20. The method of claim 1, wherein forwarding the MQ message further comprises one or more of:
  encapsulating the modified packet with an encapsulation header corresponding to the identified queue; and
  operating as an MQ broker of the message queuing service for determining the queue.

* * * * *